March 3, 1931.  R. B. KIMBALL  1,795,029
POWER COTTON CHOPPER AND TILLAGE IMPLEMENT
Filed May 28, 1929

Richard B Kimball INVENTOR
BY Loyal J Miller
ATTORNEY

Patented Mar. 3, 1931

1,795,029

UNITED STATES PATENT OFFICE

RICHARD B. KIMBALL, OF CANTON, OKLAHOMA

POWER COTTON CHOPPER AND TILLAGE IMPLEMENT

Application filed May 28, 1929. Serial No. 366,571.

My invention relates to a mechanical chopper and tillage implement to be used in thinning out and cultivating cotton plants growing in rows.

The objects of my invention are to provide a device which is new, novel, practical and of utility; which may be drawn and operated by power from a usual tractor; which may be drawn by domestic animals and be driven by power derived from its own traction; which will save labor; which may comprise one or a plurality of units; which will be positive in action; which will be adjustable; which will be relatively inexpensive in manufacture; which may be easily repaired; which is durable; which will mechanically chop out the excess of growing cotton plants in a row or a plurality of rows; which will stir and cultivate the soil between the rows; which will be economical in operation; which will perform its duties concisely and quickly; which will be efficient in accomplishing all the purposes for which it is intended.

In the growing of cotton it is necessary that each growing plant be afforded a certain space in which to grow to put on its branches and to boll. As the seed does not lend itself readily to a listing implement such as is used in check row planting of corn and the like, it is customary to plant cotton seed rather thickly in rows. Later, when the plants reach a desirable stage in growth, the excess of growing plants are manually chopped out by an ordinary garden hoe or the like. The manual process of chopping cotton is slow and laborious and must be done within certain short limits of time. Due to these conditions, only a small acreage of cotton can be handled by the usual grower, and the service of entire families, including the children, young and old, are used to attend to the crop during the chopping season. It is no infrequent occurrence, for rural schools in many communities to be dismissed during this season and for the attendance in other schools to be materially lessened.

My invention is designed to perform quickly by machinery the services now performed manually by countless numbers of men, women and children, thus releasing them to other duties of the farm, the home and the school.

Figure 1:
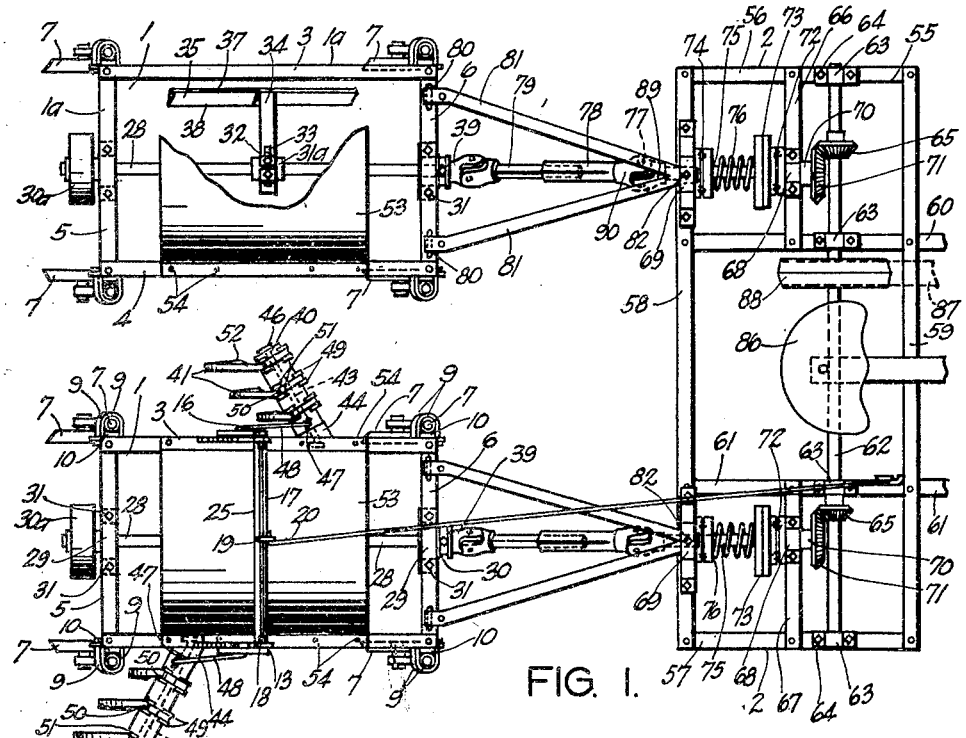
Figure 2:
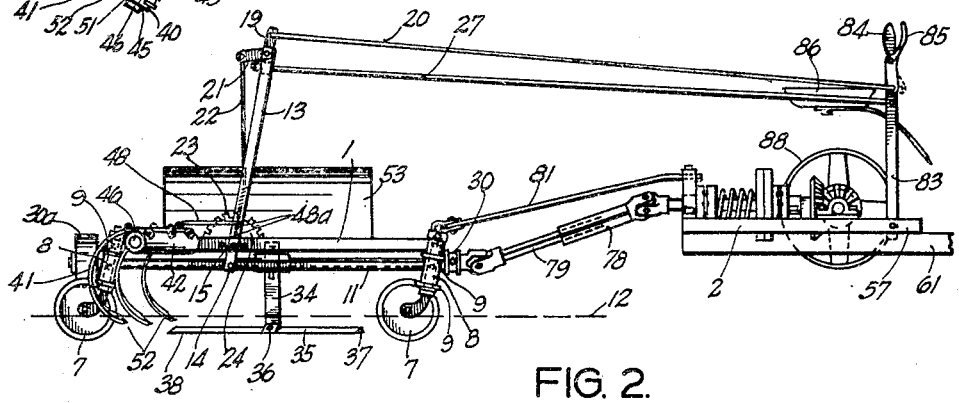

With these and other objects in view as will more fully appear my invention consists in the construction, novel features, and combination of parts hereinafter more fully described, pointed out in the claims hereto appended, and illustrated in the accompanying one-sheet drawing, of which, Figure 1 is a fragmentary plan view of two of my cotton choppers and tillage units together with their driving apparatus; and, Figure 2 is an elevational view of my device.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

A practical embodiment of the invention as illustrated in the drawings includes:

A plurality of identical power cotton chopper and tillage units 1 are driven by a power transmission unit 2, the latter being supported and driven by a power driven tractor or the like, not shown.

Said cotton chopper units comprise a rectangular frame 1a of angle iron, channel iron or the like, having sides 3 and 4 securely riveted, welded or the like, to end cross members 5 and 6 at their respective end portions. A plurality of usual flanged casters 7, together with their housings 8 are strap bolted as shown at 9 respectively to a plurality of rectangular plates 10. Said plates 10 are pivotally secured, laterally through their upper end portions, one each, externally upon the two end portions of said side 3 and likewise upon said side 4. Said plates 10 are also pivotally attached laterally, adjacent their middle portions to longitudinal strips 11 which lie respectively below said side frames 3 and 4, and aline exteriorly therewith. The described pivotal connection of said strips 10 with said strips 11 and with said side members 3 and 4, permits a backward and forward movement of said strips 11 in relation to said frame members 3 and 4 and has the effect of regulating the incline, from a vertical position, of said caster housings 8. It will be obvious that the greater the divergence, from vertical, of caster housings 8, the lower will be the hang of said frame 1a.

For the purpose of regulating the backward and forward swing of said strips 11 and consequently the height of said frame 1a from the ground 12, I provide an upstanding lever arm 13, its lower end portion pivotally secured at 14 to said strip 11, and likewise pivotally secured as shown at 15 spacedly thereabove to said side 4. Like unto said arm 13, but oppositely positioned, is a similar lever arm 16, pivotally secured at its lower end portion to the other of said strips 11 and, above, to said side 3. Said upstanding arms 13 and 16 parallel each other, and are provided with a cross-bar 17 extending therebetween, adjacent their extreme top end portions. Said bar 17 is pivotally secured, as shown at 18, at its respective ends to said arms 13 and 16 in such a manner that it may turn upon its own axis. A short, upstanding, lever arm 19 rigidly secured to the central portion of said cross-bar 17, and perpendicular thereto, is laterally perforated at its top end portion to secure pivotally the L shaped end of a control rod 20. Also secured rigidly upon each end portion of said cross-bar 17, and extending backwardly and perpendicular thereto, is a lever 21. To the free end portion of each of said levers 21 is pivotally secured a downwardly extending rod 22, the lower end of which is designed to removably seat between the teeth 23 of an upstanding serrated half disc 24. One each of said discs 24 is rigidly secured respectively upon the said sides 3 and 4. A cross-bar 25 is also axially pivoted at its ends to said lever arms 13 and 16, at their top end portions, spacedly below and parallel to said top bar 17. Said cross-bar 25 is bored at its midsection to hold securely the end 26 of a lever rod 27.

Preferably underslung, upon the central portions of said frame end members 5 and 6 I provide a shaft 28, supported by bearings 29. Said shaft 28 is provided with a thrust collar 30, adjacent its extending forward end portion, and with a weighted fly wheel 30a upon its other extending end portion. Said bearings 29 are held by bolt means 31 through said members 5 and 6. The central portion of said shaft 28 is enlarged as shown at 31a and bored and threaded externally for the accommodation of a plurality of bolts 32 which, passing through slot 33 adjustably but securely, hold an end portion of a substantial arm 34 extending at right angles to said shaft 28. Upon its other end portion said arm 34 is provided with a cross member or cutting blade 35, bolted thereto as shown at 36. Said blade 35 constituting the chopping member of my device, has a thick back portion 37 tapering to a thin cutting edge 38 and is designed to rotate with said shaft 28.

The forward end portion of said shaft 28 extends through said bearing 29 on said cross end 6, through said collar 30 and forms the rear half of an ordinary universal joint 39.

My device includes two identical tillage units 40 each adapted for fastening on the sides of said chopper units, and either or both of such tillage units may be used or not without interference with the chopping unit. Each of said tillage units 40 comprises: A plurality of curved spring steel blades 41, equidistantly spaced and mounted upon a cylinder 42, the latter axially revolvable upon a shaft 43. Said shaft 43 is substantially set, by any usual or desired means, into said sides 3 and 4, of said chopping units, respectively, and extends outwardly and horizontally therefrom, and rearwardly diagonal thereto. At its junction with said sides 3 and 4 said shaft 43 is provided with a wedge shaped collar 44 and likewise upon its free end with a collar 45 and a holding means 46. As a means of slightly rotating said cylinder 42 and the consequent raising or lowering of said curved tillage blades 41 fastened thereupon, I provide the upper side of said cylinder 42 with a longitudinal slot 47 adjacent said collar 44. Said slot 47 is designed to slidably secure the enlarged and down-turned end of a link rod 48, the other in-turned end of which is pivotally and adjustably secured in one of a plurality of perforations 48a in the lower portion of said lever arms 13 and 16, respectively. Each of said curved blades 41 are secured pivotally at their upper revolute ends by metal bolt means passing therethrough and also through a pair of upstanding lugs 49 upon the periphery of said cylinder 42. From their pivotal connection at 49 each of said blades 41 follows the periphery of said cylinder 42 at right angles to the axis of same, and passes under a wooden pin 50 the ends of which are held by perforations in a pair of lugs 51. From a point adjacent said pin 50, said blades 41 are bent angularly outward to parallel said sides 3 and 4 and thence are curved downwardly and forwardly to be formed upon their lower end portions 52 as harrow teeth, cultivator blades or otherwise as desired. Said wooden pins 50 are designed to break and to thereby release said blades 41 to an upward pivotal action, upon contact of said blades 41 with subborn obstructions, when in use, and are designed to prevent the breaking of the said teeth 41.

A shield 53 of sheet metal is provided secured by a plurality of bolt means 54 to the central section of said sides 3 and 4 and is arched upwardly to permit the unobstructed upward sweep of said cutting blade 35.

Said power transmission unit 2 comprises a frame 55 of angle iron, channel iron or the like, having ends 56 and 57, sides 58 and 59, bolted, riveted, brazed or otherwise secured at their converging corners, and is supported upon cross members 60 and 61 which are securely bolted to the frame of a tractor, not shown. A drive shaft 62, parallel to said side frames 58 and 59, is housed in a plurality of bearings 63 secured by usual bolt means 64 to said frame members and supports 56, 57, 60 and 61. Said shaft 62 is provided adjacent said support member 60 with a keyed drive pulley 88, and adjacent each of its end portions with a pinion gear 65. Extending between said end frame member 56 and said support member 60 and rigidly bolted thereto is a cross member 66. Extending between said end frame member 57 and said support member 61 and likewise bolted rigidly thereto is a cross member 67. Said cross members 66 and 67 are each provided with a shaft bearing 68, alined with similar shaft bearings 69 secured by usual means upon said side frame 58. Extending through said bearings 68 is a short, collared shaft 70 upon one end portion of which is a bevel gear 71 meshing with said pinion 65. Upon the other extending end portion of said shaft 70 is a thrust bearing 72 and one section of a clutch means 73. Extending through said bearings 69 and a thrust bearing 74 is a shaft 75 encircled by a compression spring 76, and having upon its end portion the other section of said clutch means 73. It is to be understood that as here shown, said spring 76 and said clutch means 73 are to be considered as illustrative only and not restrictive, and that any usual or desired clutch mechanism whether automatic or manually operated, or both, may be used here, the principal result desired being a slipping of the clutch when said cutting blades 35 or tillage blades 41 are caused to stop by striking an obstruction. Upon the rearward extending end portion of said shaft 75 is rigidly secured, or made integral therewith, the forward section 89 of a usual universal joint 77, the rear section 90 of which is provided with a shaft 78. Said shaft 78 serves also as a sleeve for an angular bodied shaft 79, the other end of which is provided with the remaining section of the said universal joint 39 as heretofore described.

As a means of pulling said chopper and tillage units 1 I provide, hingedly attached, as shown at 80, to the end portions of said frame members 6, arms 81 which converge at their forward end portions and are pivotally fastened as shown at 82 to said frame member 58 of said transmission unit 2.

A hand control lever 83 is pivotally positioned at its lower end portion upon said support member 61 adjacent its junction with said frame member 59. Said lever 83 at its top portion is provided with a usual rounded hand hold 84 and with a usual release lever 85 pivotally secured thereto, the lower portion of said release lever 85 being perforated for the pivotal retention of the forward end of said control rod 20. Below the lower end of said release lever 85 said hand control lever 83 pivotally holds the forward end of said lever rod 27. The numeral 86 indicates the seat of the said tractor, and 87 indicates a belt connecting said drive pulley 88 with a power take-off pulley, not shown, usual to tractors.

It will be obvious to those familiar with the art that my device, attached as described to a usual farm tractor, will be drawn down the rows of growing young cotton plants in such a manner that the travel of the said shafts 28 of said units 1, will each be immediately above and parallel with one of such rows. Further, that the said pivotal connections shown at 80 and 82, the said universal joints 39 and 77 and the said sleeved shaft arrangement as indicated at 78 and 79, will together with the pivotal arrangement of the forward pair of said casters 7, permit the travel of said units 1 over uneven ground, and also to follow rows deviating from a straight line; all without interference with the driving in a rotary manner of said shafts 28. Also, because of the pivotal arrangements as described above, the device may be turned at the row ends. It may well develop in use, that the rear pair of said usual casters 7 may better be given a rigid construction rather than a pivotal one as described, therefore it is not desired to limit these said rear casters 7 to a pivotal construction.

In field operation of my machine it is apparent that power originating in said tractor will be transmitted through said belt 87 to said drive shaft 62 by means of said drive pulley 88. Through said pinion 65 and bevel gear 71, said shaft 70, clutch 73, sleeved shaft 78 and angular shaft 79 said shaft 28 will be rotated, and thereby also said cutting blade 35. The said cutting blade 35 is adjustably set as heretofore described to sweep in its rotary fashion at its lowermost position, slightly beneath the earth surface as indicated at 12 in Fig. 2, thus cutting off with each downward movement, the young cotton plants in the path of its rotary swing. As the device as a whole, when in operation, has a continuous forward movement, the downward, cutting strokes of said blade 34 will fall intermittently, thus leaving growing plants spaced at predetermined intervals.

The said tillage units 40 at either side of the said chopper units are designed to scarify the earth ridges between the rows and are independently adjustable by means of the engagement of said link rods 43 in one or another of said perforations 48a in the said lever arms 13 and 16. The adjustment of height of the chopper and tillage units as a whole is attained through the movement of said levers 13 and 16 by means of said control rod 27 and said hand control lever 83, the said toothed half disc 24, down rod 22, control rod 20 and release lever 85 serving as a locking device therefor.

As described herein and illustrated herewith my said device is drawn and powered by a usual farm tractor. It is not however desired to limit it in this manner, as the same results may be secured through the substitution of domestic animals or other pulling means for the tractor, the provision of a tongue and wheels upon said transmission unit 2, and the connection of said drive shaft 62 with power furnished by said unit's own traction, all of said substitutions and additions in a manner known and usual with horse drawn farm implements and power drives.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device other than as herein described as fairly fall within the scope of my invention.

Having thus described my invention what is claimed and desired to be secured by Letters Patent, is:

1. A device, as described, embodying, a transmission unit, a vertically adjustable wheeled chopping unit having a frame, and a plurality of tillage units pivotally mounted upon the sides of said chopping unit, said transmission unit supporting a drive shaft and adapted to be supported by a tractor and to draw said chopping unit, said drive shaft adapted to be actuated by the engine of said tractor, said chopping unit comprising a second shaft carried by said frame and driven by said drive shaft, a chopping blade mounted adjustably upon and rotatable with said second shaft, said blade adjacent the bottom of its sweep adapted to contact the earth, said plurality of tillage units each comprising a plurality of spaced spring harrow teeth for contacting and cultivating the earth, means upon said transmission unit and said chopping unit for adjusting vertically said chopping unit and said tillage units with respect to the surface of the earth, all as and for the purposes specified.

2. A device, as described, embodying, a transmission unit, a plurality of vertically adjustable wheeled chopping units, each having a frame, and a plurality of tillage units pivotally mounted upon the sides of each of said chopping units, said transmission unit supporting a drive shaft and adapted to be supported by a tractor and to draw said chopping units, said drive shaft adapted to be actuated by the engine of said tractor, each of said chopping units comprising a second shaft carried by said frame and driven by said drive shaft, a chopping blade adjustably mounted upon an arm carried by said second shaft and adapted to rotate therewith, said blade adjacent the bottom of its sweep adapted to contact the earth, said plurality of tillage units each comprising a plurality of spaced spring harrow teeth for contacting and cultivating the earth, means upon said transmission unit and said chopping units for adjusting vertically said chopping units and said tillage units with relation to the surface of the earth, all as and for the purposes specified.

3. A device, as described, embodying a transmission unit, a chopping unit, and a plurality of tillage units, said transmission unit comprising a rectangular metal frame adapted to be supported by the rear end portion of a tractor, said frame supporting a drive shaft adapted to be actuated by the engine of said tractor, a shaft perpendicular to said drive shaft adapted to be driven by said drive shaft, said perpendicular shaft having clutch means for disconnecting the power from said drive shaft, a double swiveled, sleeved shaft, said chopping unit comprising tongue means for connecting said transmission unit, a rectangular metal frame mounted upon four wheels and supporting a centrally disposed chopping blade shaft, said chopping blade shaft adapted to be driven by said double swiveled shaft, a perpendicular arm centrally and adjustably mounted upon said chopping blade shaft, a chopping blade adapted to be perpendicularly mounted upon said arm, said blade adapted to rotate with said chopping blade shaft and to contact adjacent the bottom of its sweep with the earth for chopping plants, guard means upon the frame of said chopping unit and over said rotatable blade, each of said tillage units comprising an outwardly and backwardly extending shaft rigidly mounted upon each side of said chopping unit, a cylinder rotatably positioned upon said tillage unit shaft, a plurality of curved harrow teeth spacedly and hingedly positioned upon said cylinder, said teeth adapted to contact and cultivate the surface of the earth at each side of said chopping unit, said cylinder having wood pin means for preventing the breaking of said teeth, means for adjusting the contact of said teeth and said blade with the earth from a point upon said transmission unit, all as and for the purposes specified.

4. A device, as described, embodying a transmission unit, a plurality of chopping units, and a plurality of tillage units, said transmission unit comprising a rectangular metal frame adapted to be supported by the rear end portion of a tractor, said frame supporting a drive shaft adapted to be actuated by the engine of said tractor, a plurality of shafts perpendicular to said drive shaft adapted to be driven by said drive shaft, said perpendicular shafts each having clutch means for disconnecting the power from said drive shaft, a plurality of double swiveled, sleeved shafts, said chopping units each comprising tongue means for connecting said transmission unit, a rectangular metal frame mounted upon four wheels and supporting a centrally disposed chopping blade shaft, said chopping blade shaft adapted to be driven by said double swiveled shaft, a perpendicular arm centrally and adjustably mounted upon said chopping blade shaft, a chopping blade adapted to be perpendicularly mounted upon said arm, said blade adapted to rotate with said chopping blade shaft and to contact adjacent the bottom of its sweep with the earth for chopping plants, guard means upon said chopping unit and over said rotatable blade, each of said tillage units comprising an outwardly and backwardly extending shaft rigidly mounted upon each side of each of said chopping units, a cylinder rotally positioned upon said tillage unit shaft, a plurality of curved teeth spacedly and hingedly positioned upon said cylinder, said teeth adapted to contact and cultivate the surface of the earth at each side of each of said chopping units, said cylinder having wood pin means for preventing the breaking of said teeth, means for adjusting the contact of said teeth and said blade with the earth from a point upon said transmission unit, all as and for the purposes specified.

5. A device, as described, in combination, a transmission unit, a chopping unit, and a plurality of tillage units, said transmission unit comprising a rectangular metal frame adapted to be supported by the rear end portion of a tractor, said frame supporting a drive shaft adapted to be actuated by the engine of said tractor, a shaft perpendicular to said drive shaft adapted to be driven by said drive shaft, said perpendicular shaft having clutch means for disconnecting the power from said drive shaft, a double swiveled, sleeved shaft, said chopping unit comprising tongue means for connecting said transmission unit, a rectangular metal frame mounted upon four wheels and supporting a centrally disposed chopping blade shaft, said chopping blade shaft adapted to be driven by said double swiveled shaft, a perpendicular arm centrally and adjustably mounted upon said chopping blade shaft, a chopping blade adapted to be perpendicularly mounted upon said arm, said blade adapted to rotate with said chopping blade shaft and to contact adjacent the bottom of its sweep with the earth for chopping plants, guard means upon said chopping unit and over said rotatable blade, each of said tillage units comprising an outwardly and backwardly extending shaft rigidly mounted upon each side of said chopping unit, a cylinder rotally positioned upon said tillage unit shaft, a plurality of curved teeth spacedly and hingedly positioned upon said cylinder, said teeth adapted to contact and cultivate the surface of the earth at each side of said chopping unit, said cylinder having wood pin means for preventing the breaking of said teeth, means for adjusting the contact of said teeth and said blade with the earth from a point upon said transmission unit, all as and for the purposes specified.

6. A device, as described, in combination, a transmission unit, a plurality of chopping units, and a plurality of tillage units, said transmission unit comprising a rectangular metal frame adapted to be supported by the rear end portion of a tractor, said frame supporting a drive shaft adapted to be actuated by the engine of said tractor, a plurality of shafts perpendicular to said drive shaft adapted to be driven by said drive shaft, said perpendicular shafts each having clutch means for disconnecting the power from said drive shaft, a plurality of double swiveled, sleeved shafts, said chopping units each comprising tongue means for connecting said transmission unit, a rectangular metal frame mounted upon four wheels and supporting a centrally disposed chopping blade shaft, said chopping blade shaft adapted to be driven by said double swiveled shaft, a perpendicular arm centrally and adjustably mounted upon said chopping blade shaft, a chopping blade adapted to be perpendicularly mounted upon said arm, said blade adapted to rotate with said chopping blade shaft and to contact adjacent the bottom of its sweep with the earth for chopping plants, guard means upon said chopping unit and over said rotatable blade, each of said tillage units comprising an outwardly and backwardly extending shaft rigidly mounted upon each side of each of said chopping units, a cylinder rotally positioned upon said tillage unit shaft, a plurality of curved teeth spacedly and hingedly positioned upon said cylinder, said teeth adapted to contact and cultivate the surface of the earth at each side of each of said chopping units, said cylinder having wood pin means for preventing the breaking of said teeth, means for adjusting the contact of said teeth and said blade with the earth from a point upon said transmission unit, all as and for the purposes specified.

7. A device, as described, embodying a transmission unit carried on vehicle wheels supporting a drive shaft, adapted to be driven by the traction of said vehicle wheels, a wheeled chopping unit, and a plurality of tillage units mounted upon the side frame of said chopping unit, said chopping unit comprising a rotal chopping blade mounted upon a shaft, said chopping blade shaft adapted to be rotated by said drive shaft, said blade adjacent the bottom of its sweep adapted to contact the earth, said plurality of tillage units each comprising a plurality of spaced spring harrow teeth for contacting and cultivating the earth, means upon said transmission unit and said chopping unit for adjusting vertically said chopping unit and said tillage unit, all as and for the purposes specified.

8. A device, as described, embodying a transmission unit carried by wheels and supporting a drive shaft adapted to be driven by the traction of said vehicle wheels, a plurality of wheeled chopping units, and a plurality of tillage units mounted upon the side frames of said chopping units, each of said chopping units comprising a rotal chopping blade mounted upon a shaft, said chopping blade shaft adapted to be rotated by said drive shaft, said blade adjacent the bottom of its sweep adapted to contact the earth, said plurality of tillage units each comprising a plurality of spaced spring harrow teeth for contacting and cultivating the earth, means upon said transmission unit and said chopping units for adjusting vertically said chopping units and said tillage units, all as and for the purposes specified.

RICHARD B. KIMBALL.